(12) United States Patent
Daeubel et al.

(10) Patent No.: US 9,284,936 B2
(45) Date of Patent: Mar. 15, 2016

(54) METHOD AND DEVICE FOR CONTROLLING THE EXHAUST GAS RECIRCULATION RATE FOR INTERNAL COMBUSTION ENGINES DURING LEAN OPERATION

(75) Inventors: Ralf Daeubel, Markgroeningen (DE); Guido Porten, Vaihingen/Enz (DE); Markus Amler, Leonberg-Gebersheim (DE); Matthias Walz, Wiernsheim (DE); Uwe Mueller, Cleebronn (DE); Jan-Mathias Meng, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 693 days.

(21) Appl. No.: 13/637,175

(22) PCT Filed: Mar. 16, 2011

(86) PCT No.: PCT/EP2011/053940
§ 371 (c)(1),
(2), (4) Date: Dec. 5, 2012

(87) PCT Pub. No.: WO2011/117123
PCT Pub. Date: Sep. 29, 2011

(65) Prior Publication Data
US 2013/0068197 A1 Mar. 21, 2013

(30) Foreign Application Priority Data
Mar. 25, 2010 (DE) .......................... 10 2010 003 281

(51) Int. Cl.
*F02B 47/08* (2006.01)
*F02P 5/04* (2006.01)
(Continued)

(52) U.S. Cl.
CPC .............. *F02P 5/045* (2013.01); *F02D 41/0052* (2013.01); *F02D 41/1498* (2013.01);
(Continued)

(58) Field of Classification Search
CPC ......... Y02T 10/46; Y02T 10/42; Y02T 10/18; Y02T 10/47; Y02T 10/121; Y02T 10/144; F02D 2041/001; F02D 41/0002; F02D 37/02; F02D 13/0261; F02D 13/0207; F02D 41/307; F02D 41/006; F02D 13/0219; F02D 41/3023; F02D 41/0052; F02D 41/1498; F02D 2200/1002; F02D 2200/1015; F02P 5/045
USPC .............. 123/406.12–406.52, 568.11–568.21
See application file for complete search history.

(56) References Cited

U.S. PATENT DOCUMENTS

| 4,315,492 A | * | 2/1982 | Gardner | .................... 123/406.29 |
| 5,150,680 A | * | 9/1992 | Nishimura | .................... 123/399 |

(Continued)

FOREIGN PATENT DOCUMENTS

| CN | 1158942 | 9/1997 |
| DE | 101 58 796 | 6/2002 |

(Continued)

OTHER PUBLICATIONS

International Search Report, PCT International Application No. PCT/EP2011/053940, dated Jul. 13, 2011.

*Primary Examiner* — Thomas Moulis
*Assistant Examiner* — Joseph Dallo
(74) *Attorney, Agent, or Firm* — Kenyon & Kenyon LLP

(57) ABSTRACT

A method for setting an exhaust gas recirculation rate in an engine system having an internal combustion engine, the exhaust gas recirculation rate indicating the portion of the exhaust gas recirculated into one cylinder of the internal combustion engine with regard to the total gas quantity present in the cylinder, including: operating the internal combustion engine according to an input for the exhaust gas recirculation rate, an ignition of an air/fuel mixture being carried out in the cylinder at a certain ignition timing; adjusting the ignition timing in the cylinder of the internal combustion engine; correcting the input for the exhaust gas recirculation rate as a function of a change in an operating behavior of the internal combustion engine due to the ignition timing adjustment.

19 Claims, 4 Drawing Sheets

(51) Int. Cl.
*F02D 41/00* (2006.01)
*F02D 41/14* (2006.01)
*F02D 41/30* (2006.01)

(52) U.S. Cl.
CPC .... *F02D41/3023* (2013.01); *F02D 2200/1002* (2013.01); *F02D 2200/1015* (2013.01); *Y02T 10/47* (2013.01)

(56) References Cited

U.S. PATENT DOCUMENTS

| | | | | |
|---|---|---|---|---|
| 5,303,168 | A * | 4/1994 | Cullen et al. | 700/299 |
| 5,577,476 | A * | 11/1996 | Iyoda | 123/406.33 |
| 5,623,906 | A * | 4/1997 | Storhok | 123/406.23 |
| 5,749,334 | A | 5/1998 | Oda et al. | |
| 5,797,370 | A * | 8/1998 | Kimura et al. | 123/478 |
| 6,041,755 | A * | 3/2000 | Mashiki | 123/406.29 |
| 6,062,204 | A * | 5/2000 | Cullen | 123/568.22 |
| 6,681,567 | B2 | 1/2004 | Yasui et al. | |
| 6,729,301 | B2 * | 5/2004 | Nakamori et al. | 123/406.48 |
| 6,739,295 | B1 * | 5/2004 | Yamaoka et al. | 123/90.15 |
| 7,089,913 | B2 * | 8/2006 | Yamaoka et al. | 123/406.48 |
| 7,886,712 | B2 | 2/2011 | Hartmann et al. | |
| 8,457,866 | B2 * | 6/2013 | Itoga et al. | 701/108 |
| 2002/0124831 | A1 * | 9/2002 | Kondo | 123/406.47 |
| 2003/0209234 | A1 * | 11/2003 | Kinomura et al. | 123/568.22 |
| 2003/0226544 | A1 * | 12/2003 | Nakamori et al. | 123/406.48 |
| 2004/0149263 | A1 * | 8/2004 | Tanei et al. | 123/406.29 |
| 2006/0137326 | A1 * | 6/2006 | Saito et al. | 60/277 |
| 2006/0201152 | A1 * | 9/2006 | Irisawa | 60/605.1 |
| 2007/0012289 | A1 * | 1/2007 | Yamaguchi et al. | 123/406.47 |
| 2007/0062483 | A1 * | 3/2007 | Yang | 123/295 |
| 2007/0062486 | A1 * | 3/2007 | Yang | 123/305 |
| 2007/0119418 | A1 * | 5/2007 | Kojima et al. | 123/305 |
| 2008/0283025 | A1 * | 11/2008 | Sato | 123/406.45 |
| 2009/0266335 | A1 * | 10/2009 | Kawamura et al. | 123/406.19 |
| 2009/0281710 | A1 * | 11/2009 | Mallebrein et al. | 701/104 |
| 2010/0010728 | A1 * | 1/2010 | Stein et al. | 701/108 |
| 2010/0162707 | A1 * | 7/2010 | Ando | 60/719 |

FOREIGN PATENT DOCUMENTS

| | | | |
|---|---|---|---|
| DE | 10 2007 006 937 | | 8/2008 |
| EP | 1 296 058 | | 3/2003 |
| EP | 1 754 874 | | 2/2007 |
| JP | 2005337034 A | * | 12/2005 ............. F02D 45/00 |

* cited by examiner

METHOD AND DEVICE FOR CONTROLLING THE EXHAUST GAS RECIRCULATION RATE FOR INTERNAL COMBUSTION ENGINES DURING LEAN OPERATION

FIELD OF THE INVENTION

The present invention relates to internal combustion engines, in particular internal combustion engines which have an exhaust gas recirculation and which may be operated in lean operation.

BACKGROUND INFORMATION

In addition to conventional operating procedures, it is also possible to operate gasoline engines in a so-called lean operation. During the lean operation, the combustion takes place in the cylinders of the gasoline engine in the presence of excess air, which is typical for diesel engines. To maintain the ignitability, the fuel is injected into the cylinders in such a way that at the ignition timing of the spark plug, an ignitable air/fuel mixture is present in the area of the spark plug. Due to the great quantity of excess air and the high temperatures arising during the combustion, the nitrogen present in the air reacts with the atmospheric oxygen to form nitrogen oxides.

Nitrogen oxides in the exhaust gas are classified as harmful. Nitrogen oxide catalytic converters are provided to reduce nitrogen oxides with the aid of chemical reduction. From time to time, the nitrogen oxide catalytic converters must be regenerated to reduce the accumulated nitrogen oxides. In particular, in the case of a great nitrogen oxide discharge by the internal combustion engine, more nitrogen oxide is stored in the catalytic converter per time unit. Thus, the intervals between the regenerations become shorter.

The regenerations of the catalytic converters require a combustion under excess fuel (lambda smaller than 1). The combustion under excess fuel results in a greater portion of carbon monoxide, hydrogen, and/or hydrocarbons in the combustion exhaust gas which are used as reduction agents for the regeneration. Combustion under excess fuel results in a significant fuel inefficiency. To reduce the quantity of the nitrogen oxides discharged by the internal combustion engine, an exhaust gas recirculation is usually provided which admixes combustion exhaust gas to the ambient air supplied to the cylinders. The combustion exhaust gas is used in the combustion chamber of the cylinders as an inert gas, i.e., chemically, it behaves generally neutrally.

The metering of the quantity of the recirculated exhaust gas usually takes place in a pilot-controlled manner. The quantity of the recirculated exhaust gas actually supplied to the combustion chamber is calculated based on balancing the air and exhaust gas quantities with the aid of the air mass flow meter and the pressure sensor provided in the air supply system. During a completely or almost completely dethrottled engine operation, such as the one occurring during lean operation, the model on which the calculation is based, however, results in excessively high tolerances so that the calculated exhaust gas recirculation rate may considerably deviate from the actual exhaust gas recirculation rate. This effect is intensified even more when the internal combustion engine is provided with a charging device, e.g., an exhaust gas turbocharger, so that the inaccuracies to be expected in the calculation of the exhaust gas recirculation rate noticeably delimit the usable and fuel-efficient range for the operation of the internal combustion engine during lean operation.

The delimitation of the usable range for the settable exhaust gas recirculation rate results from the combustion properties deteriorating considerably to the point of misfires already in the case of an exhaust gas recirculation rate which is slightly higher than its optimum. If the actually supplied exhaust gas recirculation rates are too low, the nitrogen oxide emissions increase to a disproportionately high extent, thus resulting in frequent regenerations of the nitrogen oxide catalytic converter and a significant fuel inefficiency.

It is an object of the present invention to provide an improved method and an improved device for setting the exhaust gas recirculation rate to a usable and fuel-efficient range.

SUMMARY

According to a first aspect of the present invention, a method is provided for setting an exhaust gas recirculation rate in an engine system having an internal combustion engine. The exhaust gas recirculation rate indicates the portion of the exhaust gas recirculated into one cylinder of the internal combustion engine with regard to the total gas quantity present in the cylinder. The method includes the following steps:

operating the internal combustion engine according to an input for the exhaust gas recirculation rate, an ignition of an air/fuel mixture being carried out in the cylinder at a certain ignition timing;

adjusting the ignition timing in the cylinder of the internal combustion engine;

correcting the input for the exhaust gas recirculation rate as a function of a change in an operating behavior of the internal combustion engine due to the adjustment of the ignition timing.

One idea of the above-described method is to counteract an operating case in which the exhaust gas recirculation rate is too high, thus resulting in the risk of the combustion properties deteriorating and the frequency of misfires increasing. This is carried out by adjusting the ignition timing (ignition angle) and in order to determine based on a change in a rotational speed signal, a smooth running signal, or the like, whether the drive torque provided by the internal combustion engine is increased, reduced, or remains unchanged. As a function of the torque change resulting due to the ignition timing adjustment, it may be recognized whether the exhaust gas recirculation rate for the instantaneous operating point of the internal combustion engine is normal, too low, or too high.

Furthermore, for the operation of the internal combustion engine, the input of the exhaust gas recirculation rate may be implemented by setting a throttle valve and/or a boost pressure in an air supply section of the engine system and/or by setting an exhaust gas recirculation valve and/or by setting a camshaft position.

According to one specific embodiment, a change in the operating behavior of the internal combustion engine may be recognized as a change in a progression of a rotational speed of the internal combustion engine, a change in a provided smooth running signal which indicates a regularity of the progression of the rotational speed.

According to one specific embodiment, the input for the exhaust gas recirculation rate may be corrected when the ignition timing.

According to another aspect, an engine system is provided. The engine system includes:

an internal combustion engine;
the above-described device.

According to another aspect, a computer program product is provided having program code which carries out the above-described method when it is executed on a data processing unit.

BRIEF DESCRIPTION OF THE DRAWINGS

Preferred specific embodiments are explained in greater detail below on the basis of the figures.

DETAILED DESCRIPTION OF EXAMPLE EMBODIMENTS

Figure 1:
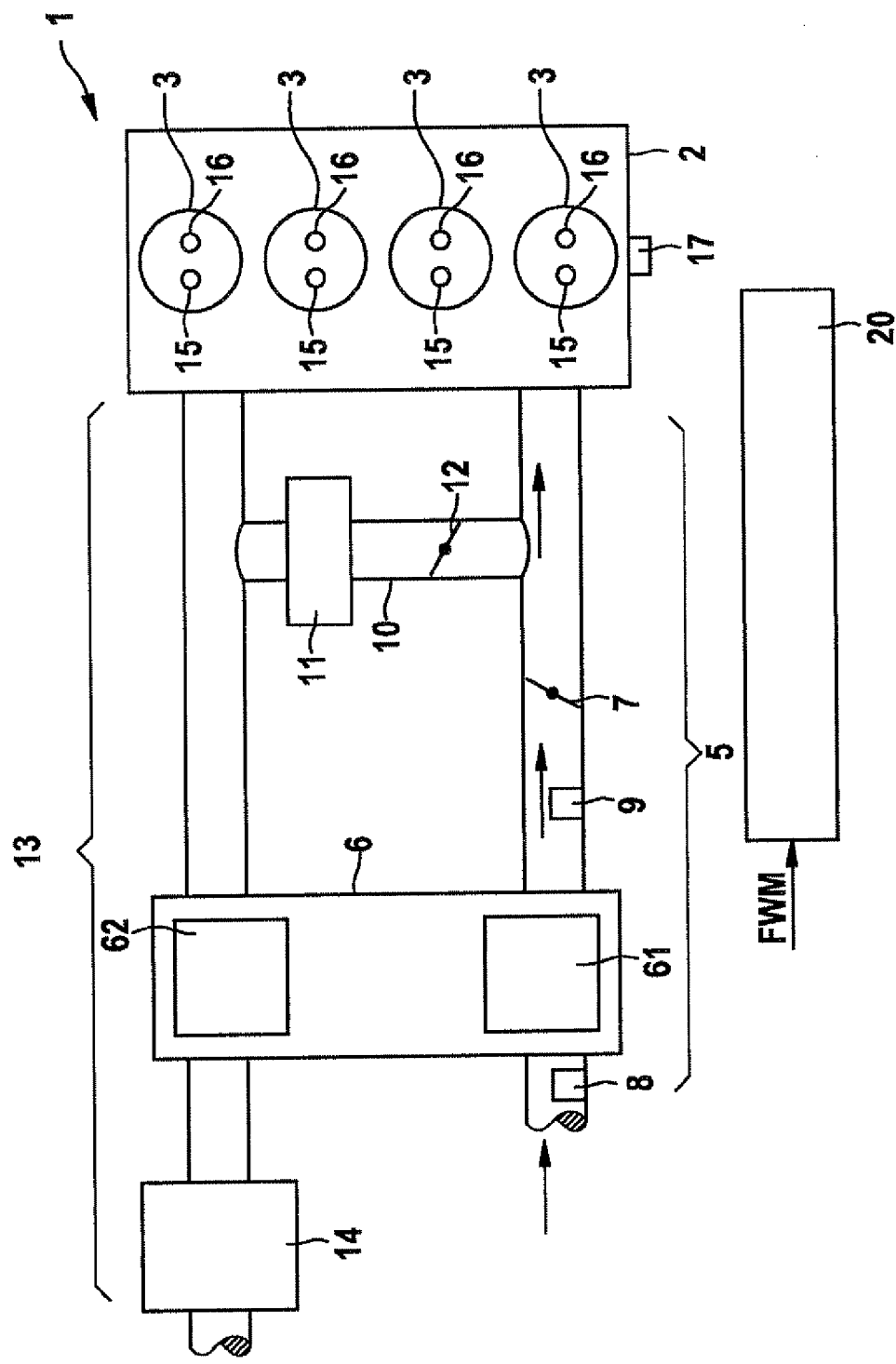
FIG. 1 shows a schematic representation of an engine system having an internal combustion engine which may be operated in a supercharged lean operation.

An engine system 1 having an internal combustion engine 2 is illustrated in FIG. 1. Internal combustion engine 2 is preferably designed as a gasoline engine which is operatable in a lean operation. The internal combustion engine may be designed as an unsupercharged or as a supercharged internal combustion engine. Internal combustion engine 2 includes four cylinders 3 in the shown specific embodiment. The number of cylinders 3 should, however, not be limited to four.

The lean operation of a gasoline engine corresponds to a stratified operation in which the fuel is injected into a combustion chamber of a cylinder 3 of internal combustion engine 2 in such a way that an ignitable mixture is present in the area of a spark plug 16 at the timing of the ignition.

Cylinders 3 are supplied with air via an air supply system 5. The air flow direction is indicated by arrows. A charging device 6, for example, in the form of an exhaust gas turbocharger, is provided in air supply system 5. Charging device 6 includes a supercharger 61 which sucks in ambient air and makes it available under boost pressure in an area of air supply section 5 between charging device 6 and a throttle valve 7. Throttle valve 7 is situated between charging device 6 and cylinders 3 of internal combustion engine 2.

Upstream from charging device 6, an air mass flow sensor 8 is provided to measure the air volume sucked in from the surroundings and to provide a corresponding air volume measuring signal.

Downstream from supercharger 61 of charging device 6 and upstream from throttle valve 7, a pressure sensor 9 is also provided to measure a boost pressure and to provide a corresponding boost pressure measuring signal. The area of air supply section 5 between throttle valve 7 and cylinders 3 of ignition timing adjustment results in a reduction of the torque provided by the internal combustion engine.

Furthermore, the input for the exhaust gas recirculation rate may be reduced, when acted on by a correction value, when a torque provided by the internal combustion engine is reduced in the case of an ignition angle retardation and when the torque provided by the internal combustion engine is increased in the case of an ignition timing advance.

It may be provided that the input for the exhaust gas recirculation rate is increased, when acted on by a correction value, when a torque provided by the internal combustion engine is increased in the case of an ignition angle retardation and when the torque provided by the internal combustion engine is reduced in the case of an ignition timing advance.

According to another aspect, a device for setting an exhaust gas recirculation rate in an engine system having an internal combustion engine is provided, the exhaust gas recirculation rate indicating the portion of the exhaust gas recirculated into one cylinder of the internal combustion engine with regard to the total gas quantity present in the cylinder. The device is designed:

to operate the internal combustion engine according to an input for the exhaust gas recirculation rate, an ignition of an air/fuel mixture being carried out in the cylinder at a certain ignition timing;

to adjust the ignition timing in the cylinder of the internal combustion engine;

to correct the input for the exhaust gas recirculation rate as a function of a change in an operating behavior of the internal combustion engine due to the adjustment of the internal combustion engine 2 is usually referred to a an intake manifold.

An exhaust gas recirculation line 10, in which an exhaust gas cooler 11 and an exhaust gas recirculation valve 12 are situated, empties into the intake manifold. With the aid of exhaust gas recirculation valve 12, the quantity of the exhaust gas introduced into the intake manifold may be set.

Combustion exhaust gas from cylinders 3 is discharged via an exhaust gas discharge section 13. Exhaust gas discharge section 13 includes a turbine 62 of charging device 6 in order to drive supercharger 61 of charging device 6 in air supply section 5. Upstream from charging device 6, a nitrogen oxide catalytic converter 14 is provided for reducing the nitrogen oxides.

Exhaust gas recirculation line 10 branches from exhaust gas discharge section 13 in the area between cylinders 3 and charging device 6. Every cylinder 3 has an injector 15 to inject fuel in accordance with an injection control signal. Furthermore, every cylinder 3 includes an ignition device 16, for example, in the form of a spark plug, to generate an ignition spark in the combustion chambers of cylinders 3 controlled by an ignition signal.

Internal combustion engine 2 is also coupled to a rotational speed sensor 17 using which a specification regarding an instantaneous rotational speed of internal combustion engine 2 may be detected and which provides a corresponding rotational speed measuring signal.

A control unit 20 is provided to operate internal combustion engine 2. Internal combustion engine 2 is controlled based on a predefined driver intended torque DIT and as a function of the instantaneous operating modes.

To detect the operating mode of engine system 1, control unit 20 receives the air volume measuring signal, the boost pressure measuring signal, the rotational speed measuring signal, as well as other signals and operates engine system 1 by setting throttle valve 7, exhaust gas recirculation valve 12, and charging device 6, as well as by establishing the ignition timings, and by controlling the injectors for setting the injection timing and the injection durations for the fuel injection.

Control unit 20 may provide the internal combustion engine 2 to be operated in lean operation. In this case, the output torque output by internal combustion engine 2 is generally determined by the injected fuel quantity. The combustion takes place under excess oxygen. In particular, in the illustrated case of supercharged internal combustion engine 2, it may be important for the determination of the ignition timing to know the gas quantities in the combustion chambers of cylinders 3 very accurately. For this purpose, an exhaust gas recirculation rate is modeled or calculated with the aid of an air system model and based on the air volume measuring signal, the boost pressure measuring signal, the rotational speed measuring signal, as well as the positions of throttle valve 7 and exhaust gas recirculation valve 12. The exhaust gas recirculation rate describes the quantity of the recirculated exhaust gas in the combustion chambers of cylinders 3. The exhaust gas recirculation rate corresponds to the ratio of the recirculated exhaust gas to the total filling in the cylinders.

The modeling of the exhaust gas recirculation rate is less accurate when a charging device is provided and due to throttle valve 7 being wide open during the lean operation, so that the usable, fuel-efficient range is greatly limited for setting the ignition timing due to the tolerances to be taken into account.

It is now provided to adjust the ignition angle during the operation of internal combustion engine 2 in one or multiple cylinders 3 and to detect an effect on the operation of internal combustion engine 2. Based on the effect of the ignition angle adjustment on the operation of internal combustion engine 2, it may be concluded whether the actual exhaust gas recirculation rate is too high, too low, or optimal.

Figure 2:
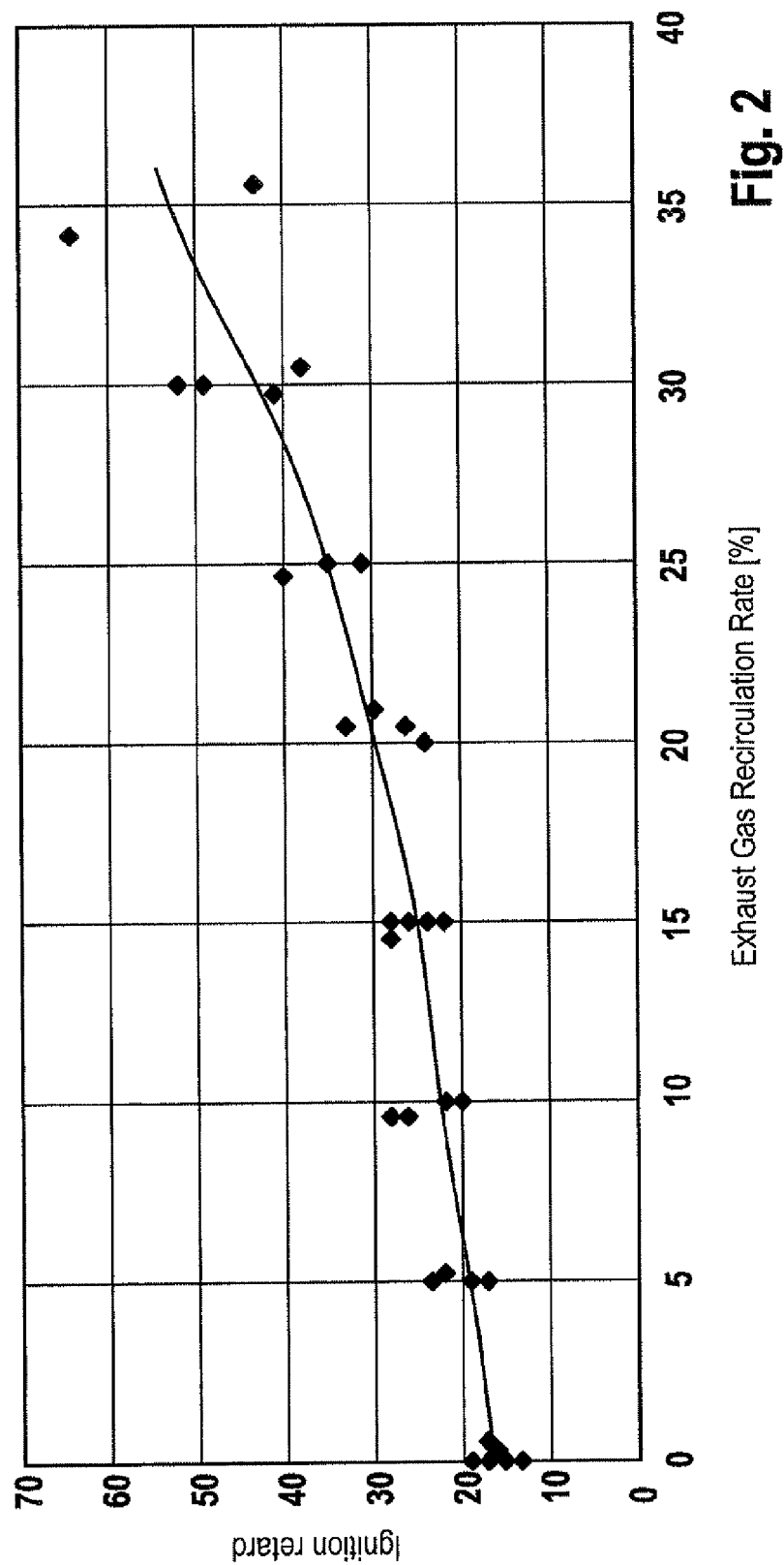
FIG. 2 shows a diagram to illustrate the dependence of the ignition retard on the actual exhaust gas recirculation rate of the internal combustion engine.

The combustion progression in cylinders 3 changes as the exhaust gas recirculation rates change. If, for example, the exhaust gas recirculation rate is greatly increased, the ignition of the mixture is retarded more and more, thus resulting in a later position of the center of combustion. The dependence between the exhaust gas recirculation rate and the ignition retard is illustrated in crankshaft angle degrees (° CAD) in the diagram of FIG. 2.

Figure 3:
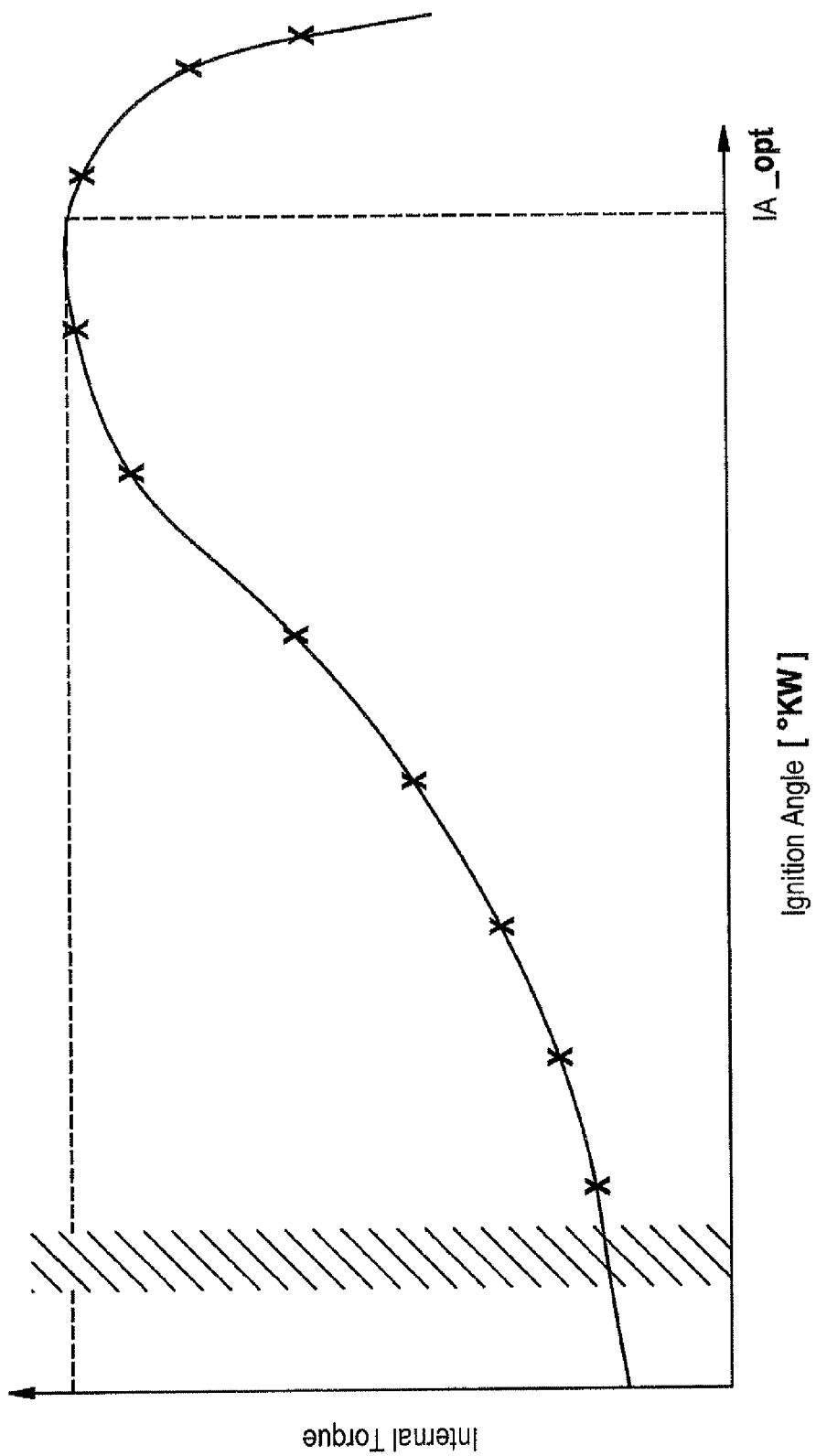
FIG. 3 shows a diagram to illustrate the dependence of an internal engine torque on the ignition angle.

A later center of combustion results in a smaller drive torque of the internal combustion engine. In the diagram of FIG. 3, the characteristics curve of an internal torque of the internal combustion engine is illustrated against ignition angle IA. It is apparent that starting from optimal ignition angle IA_opt, an ignition angle adjustment to a later ignition angle as well as to earlier ignition angles results in a decreasing internal torque. In contrast, in the case of an ignition angle which is too early (in FIG. 3 on the left-hand side of the optimal ignition angle) with regard to optimal ignition angle IA_opt, an ignition angle retardation (ignition timing retard) results in an increasing drive torque, and an ignition angle advance (ignition timing advance) results in a decreasing drive torque. When comparing the retarded ignition angle in FIG. 3 on the right-hand side of the optimal ignition angle to the optimal ignition angle, it may conversely be observed that the internal torque is rapidly reduced when the ignition timing is further retarded (retardation). Further retardation of the ignition angle rapidly results in misfires. However, in the case of an ignition angle advance the internal torque slightly increases.

It is now proposed to make use of this behavior for a setting of the optimal exhaust gas recirculation rate and to temporarily adjust the ignition angle in one of cylinders 3, in multiple cylinders 3 or in all cylinders 3, and to analyze the corresponding reaction of the operating behavior of the internal combustion engine. In the described exemplary embodiment, the operating behavior is analyzed based on the rotational speed of internal combustion engine 2. A signal which is derived from the rotational speed, e.g., a smooth running signal, may be analyzed instead of the rotational speed. Such a smooth running signal indicates the regularity of the rotational speed.

Figure 4:
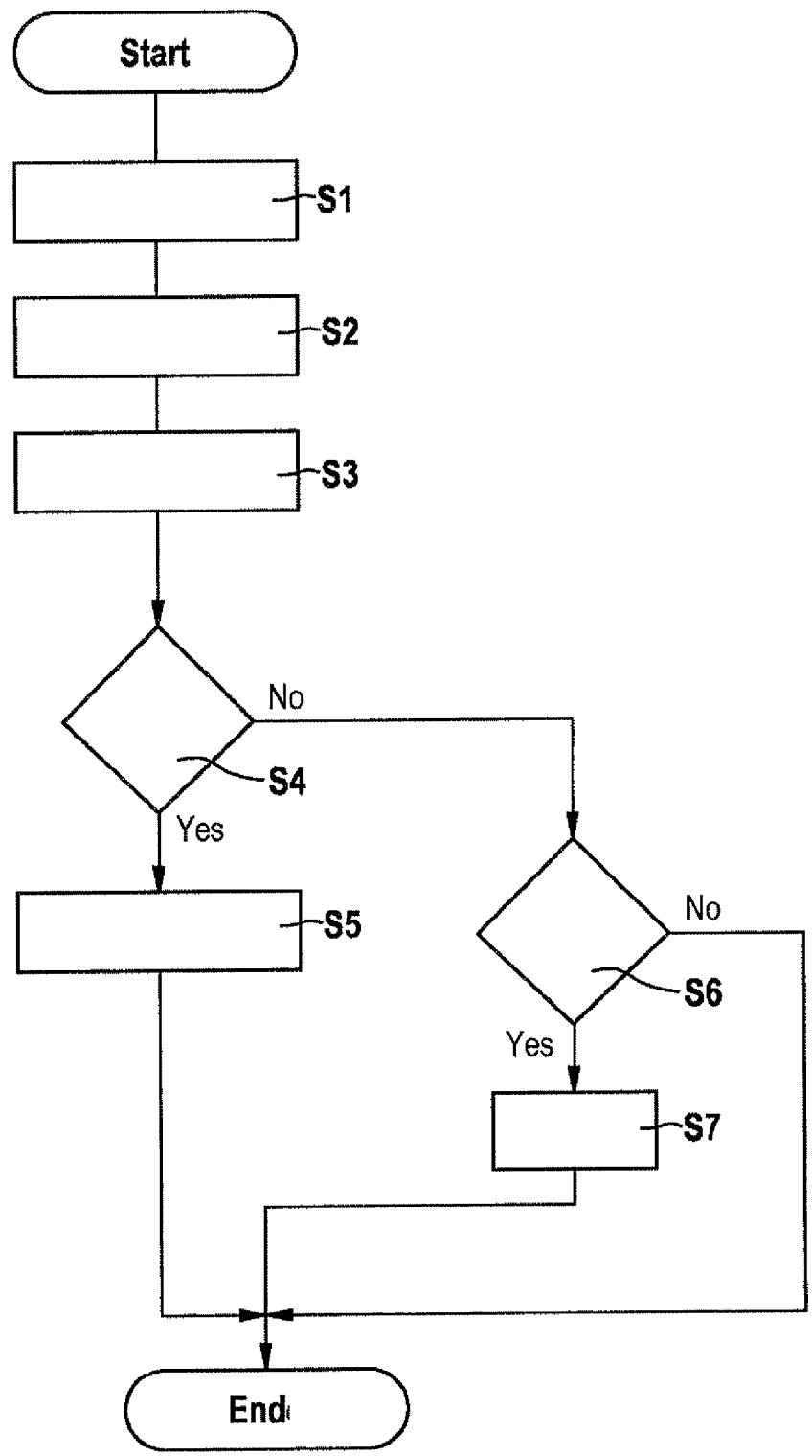
FIG. 4 shows a flow chart to illustrate the method for setting the exhaust gas recirculation rate.

An example method for adapting the exhaust gas recirculation rate is illustrated in detail in the flow chart of FIG. 4.

In step S1, internal combustion engine 2 is operated in lean operation at an exhaust gas recirculation rate which is usually set by a pilot control of the appropriate actuators. It is possible to influence the exhaust gas recirculation rate via the position of throttle valve 7, the position of exhaust gas recirculation valve 12, as well as, if possible, by setting the camshafts via which the inlet times of the air into cylinders 3 may be controlled.

In step S2, the ignition angle is adjusted toward advance in one of cylinders 3, i.e., is chronologically advanced by a certain absolute value. The degree of the ignition angle advance is selected in such a way that it is possible to detect a measurable change in the drive torque when the exhaust gas recirculation rate is not optimally set. The degree of the ignition angle advance may be predefined as a specification of an ignition angle or as a time lag which is, however, a function of the rotational speed of internal combustion engine 2.

It is checked in the following whether a change in the internal torque of relevant cylinder 3 has resulted due to the ignition angle advance. The increasing internal torque (drive torque) due to the ignition timing advance in cylinder 3, at which the ignition timing has been adjusted, is detectable with the aid of the rotational speed measuring signal. For relevant cylinder 3, the segment time, i.e., the time duration during which the cylinder is in the power stroke, is shorter in this case. Therefore, the rotational speed measuring signal is initially read in in step S3 and a smooth running signal, a segment time (time duration during which a piston in the cylinder is in the power stroke, in particular the time duration between a top dead center and a bottom dead center), or a drive torque are derived therefrom.

In step S4, it is checked whether the internal torque has increased due to the ignition angle advance. If this is the case (alternative: yes), the actual exhaust gas recirculation rate is too high because the ignition retard of the combustion position has decreased due to the ignition intervention.

In this case, a reduction of the exhaust gas recirculation rate is necessary in step S5. As previously described, the exhaust gas recirculation rate may be influenced by changing the position of throttle valve 7 or of exhaust gas recirculation valve 12.

If it is determined in step S4 that the internal torque increase is not due to the ignition angle advance (alternative: no), the actual exhaust gas recirculation rate is not too high. It is then checked in step S6 whether the internal torque has been reduced due to the ignition angle advance. This may be determined based on the prolonged segment time of cylinder 3. If this is the case (alternative: yes), the actual exhaust gas recirculation rate is too low and measures must be taken in step S7 to raise the exhaust gas recirculation rate. If the internal torque of relevant cylinder 3 is not reduced in the case of an ignition angle advance (alternative: no), it may be concluded that the exhaust gas recirculation rate has not been too high and may thus be left as is.

The measures for correcting the exhaust gas recirculation rate in steps S5 and S7 are carried out in such a way that a pilot control of one or multiple of the relevant actuators may be changed incrementally or they may be acted on by an appropriate correction value so that the actual exhaust gas recirculation rate moves toward the optimal exhaust gas recirculation rate when steps S3 through 87 are carried out multiple times.

This example method in step 93 may also be carried out using an ignition angle retardation in one or multiple cylinders 3, it being possible to determine an excessively low exhaust gas recirculation rate at a rising drive torque and an excessively high exhaust gas recirculation rate at a dropping drive torque. If the exhaust gas recirculation rate is too high for the instantaneous operating point of the internal combustion engine, another ignition angle retardation may, however, result in significantly worse characteristics and misfires which are noticeable by the driver of a motor vehicle operated using the internal combustion engine. Therefore, it is advantageous to initially carry out an ignition angle advance and thus to check whether an excessively high exhaust gas recirculation rate is present.

What is claimed is:

1. A method for setting an exhaust gas recirculation rate in an engine system having an internal combustion engine, the exhaust gas recirculation rate indicating a portion of the exhaust gas recirculated into one cylinder of the internal combustion engine with regard to a total gas quantity present in the cylinder, the method comprising:
   operating the internal combustion engine according to an input for the exhaust gas recirculation rate, an ignition of an air/fuel mixture being carried out in the cylinder at a certain ignition timing;
   adjusting the ignition timing in the cylinder of the internal combustion engine; and
   correcting the input for the exhaust gas recirculation rate as a function of a change in an operating behavior of the internal combustion engine due to the ignition timing adjustment,
   wherein the input for the exhaust gas recirculation rate is increased, when:
   (i) acted on by a correction value, and
   (ii) a torque provided by the internal combustion engine is: a) increased in a case of an ignition timing retardation or b) reduced in a case of an ignition timing advance.

2. The method as recited in claim 1, wherein, for the operating of the internal combustion engine, the input of the exhaust gas recirculation rate is implemented by at least one of setting a throttle valve in an air supply section, or setting a boost pressure in an air supply section of the engine system, setting an exhaust gas recirculation valve, and setting a camshaft position.

3. The method as recited in claim 1, wherein a change in the operating behavior of the internal combustion engine is recognized as a change in a progression of a rotational speed of the internal combustion engine, a smooth running signal indicating a regularity of the progression of the rotational speed.

4. The method as recited in claim 1, wherein the input for the exhaust gas recirculation rate is corrected when the ignition timing adjustment results in a reduction of a torque provided by the internal combustion engine.

5. The method as recited in claim 4, wherein the input for the exhaust gas recirculation rate is reduced, when acted on by a correction value, when a torque provided by the internal combustion engine is reduced in a case of an ignition timing retardation and when the torque provided by the internal combustion engine is increased in the case of an ignition timing advance.

6. A device for setting an exhaust gas recirculation rate in an engine system having an internal combustion engine, the exhaust gas recirculation rate indicating a portion of the exhaust gas recirculated into one cylinder of the internal combustion engine with regard to the total gas quantity present in the cylinder, the device being configured to operate the internal combustion engine according to an input for the exhaust gas recirculation rate, an ignition of an air/fuel mixture being carried out in the cylinder at a certain ignition timing, to adjust the ignition timing in the cylinder of the internal combustion engine, and to correct the input for the exhaust gas recirculation rate as a function of a change in an operating behavior of the internal combustion engine due to the ignition timing adjustment, the input for the exhaust gas recirculation rate being increased, when:
   (i) acted on by a correction value, and
   (ii) a torque provided by the internal combustion engine is:
   a) increased in a case of an ignition timing retardation or
   b) reduced in the case of an ignition timing advance.

7. An engine system, comprising:

an internal combustion engine; and a device for setting an exhaust gas recirculation rate in an engine system having an internal combustion engine, the exhaust gas recirculation rate indicating a portion of the exhaust gas recirculated into one cylinder of the internal combustion engine with regard to the total gas quantity present in the cylinder, the device being configured to operate the internal combustion engine according to an input for the exhaust gas recirculation rate, an ignition of an air/fuel mixture being carried out in the cylinder at a certain ignition timing, to adjust the ignition timing in the cylinder of the internal combustion engine, and to correct the input for the exhaust gas recirculation rate as a function of a change in an operating behavior of the internal combustion engine due to the ignition timing adjustment, the input for the exhaust gas recirculation rate being increased, when:

(i) acted on by a correction value, and (ii) a torque provided by the internal combustion engine is: a) increased in a case of an ignition timing retardation or b) reduced in a case of an ignition timing advance.

8. A computer-readable medium storing program code, the program code, when executed by a data processing unit, causing the data processing unit to perform the steps of:
   operating an internal combustion engine according to an input for an exhaust gas recirculation rate, an ignition of an air/fuel mixture being carried out in a cylinder of the internal combustion engine at a certain ignition timing;
   adjusting the ignition timing in the cylinder of the internal combustion engine; and
   correcting the input for the exhaust gas recirculation rate as a function of a change in an operating behavior of the internal combustion engine due to the ignition timing adjustment, wherein the input for the exhaust gas recirculation rate is increased, when:
   (i) acted on by a correction value, and
   (ii) a torque provided by the internal combustion engine is: a) increased in a case of an ignition timing retardation or b) reduced in a case of an ignition timing advance.

9. The method as recited in claim 1, wherein the input for the exhaust gas recirculation rate is decreased, when:
   (i) acted on by the correction value, and
   (ii) when the torque provided by the internal combustion engine is: a) reduced in the case of the ignition timing retardation or b) increased in the case of the ignition timing advance.

10. The device as recited in claim 6, wherein the input for the exhaust gas recirculation rate is decreased, when:
   (i) acted on by the correction value, and
   (ii) when the torque provided by the internal combustion engine is: a) reduced in the case of the ignition timing retardation or b) increased in the case of the ignition timing advance.

11. The engine system as recited in claim 7, wherein the input for the exhaust gas recirculation rate is decreased, when:
(i) acted on by the correction value, and
(ii) when the torque provided by the internal combustion engine is: a) reduced in the case of the ignition timing retardation or b) increased in the case of the ignition timing advance.

12. The computer-readable medium as recited in claim 8, wherein the input for the exhaust gas recirculation rate is decreased, when:
(i) acted on by the correction value, and
(ii) when the torque provided by the internal combustion engine is: a) reduced in the case of the ignition timing retardation or b) increased in the case of the ignition timing advance.

13. The method as recited in claim 1, further comprising selecting a degree of an ignition timing advance such that a measurable change in the torque is detected when the exhaust gas recirculation rate is not optimally set.

14. The method as recited in claim 13, wherein the degree of the ignition timing advance is selected according to a predefined angle according to: i) an ignition angle or ii) a time lag that is set as a function of a rotational speed of the internal combustion engine.

15. The method as recited in claim 13, further comprising determining whether a change in the torque was due to the ignition timing advance.

16. The method as recited in claim 15, further comprising: responsive to the determination indicating that the change in torque was due to the ignition timing advance, setting the correction value to decrease the input for the exhaust gas recirculation rate.

17. The method as recited in claim 15, further comprising: responsive to the determination indicating that an increase in torque was not due to the ignition timing advance, checking whether the torque was reduced due to the ignition timing advance,
wherein the change in the torque is the increase in torque.

18. The method as recited in claim 17, wherein:
if the torque was reduced due to the ignition timing advance: setting the correction value to increase the input for the exhaust gas recirculation rate, and
if the torque was not reduced due to the ignition timing advance: maintaining the exhaust gas recirculation rate.

19. The method as recited in claim 1, wherein the correcting of the input for the exhaust gas recirculation rate includes adjusting, incrementally, the correction value.

* * * * *